(12) United States Patent
Jung

(10) Patent No.: US 8,457,875 B2
(45) Date of Patent: Jun. 4, 2013

(54) CIRCUMFERENCE SEARCH METHOD FOR SETTING PATH AND NAVIGATION SYSTEM

(75) Inventor: Yun Wook Jung, Incheon (KR)

(73) Assignee: Thinkware Systems Corporation, Seoul (KR)

( * ) Notice: Subject to any disclaimer, the term of this patent is extended or adjusted under 35 U.S.C. 154(b) by 643 days.

(21) Appl. No.: 12/600,354

(22) PCT Filed: Dec. 18, 2007

(86) PCT No.: PCT/KR2007/006616
§ 371 (c)(1),
(2), (4) Date: Nov. 16, 2009

(87) PCT Pub. No.: WO2008/140167
PCT Pub. Date: Nov. 20, 2008

(65) Prior Publication Data
US 2010/0161221 A1    Jun. 24, 2010

(30) Foreign Application Priority Data
May 16, 2007    (KR) .................. 10-2007-0047720

(51) Int. Cl.
*G01C 21/30* (2006.01)
(52) U.S. Cl.
USPC ....................................... 701/209
(58) Field of Classification Search
USPC ....................... 701/409, 410, 209
See application file for complete search history.

(56) References Cited

U.S. PATENT DOCUMENTS
6,801,850 B1 * 10/2004 Wolfson ............... 701/410

FOREIGN PATENT DOCUMENTS
| JP | 10-089976 | 10/1998 |
| JP | 2007-017268 | 1/2007 |
| JP | 2007024499 | 2/2007 |
| KR | 1019990040848 A | 6/1999 |
| KR | 1020040064868 A | 7/2004 |

OTHER PUBLICATIONS

Patent Cooperation Treaty, "International Search Report and Written Opinion", ISA/KR, by Officer Lee Byung Kyul in PCT Application No. PCT/KR07/006616; Document of 8 pages dated Mar. 24, 2008.

* cited by examiner

*Primary Examiner* — Eric Culbreth
(74) *Attorney, Agent, or Firm* — Duane Morris LLP; Pablo Meles

(57) ABSTRACT

The present invention relates to a navigation system and vicinity search method for route setting to retrieve a facility around a route and set an intermediate point through a vicinity search. The vicinity search method for route setting, the vicinity search method including: retrieving a route between a start point and a destination; retrieving a facility with respect to at least one category based on the retrieved route according to a command of a user; and displaying the retrieved facility for each category on the retrieved route.

18 Claims, 11 Drawing Sheets

FIG. 3

| 8 | . | . | . | . | . | 56 | 64 |
|---|---|---|---|---|---|----|----|
| 7 | . | . | . | . | . | .  | 63 |
| 6 | . | . | . | . | . | .  | 62 |
| 5 | . | . | . | . | . | .  | 61 |
| 4 | . | . | . | . | . | .  | 60 |
| 3 | . | . | . | . | . | .  | 59 |
| 2 | 10| . | . | . | . | .  | 58 |
| 1 | 9 | . | . | . | . | .  | 57 |

8X8 MESH

1: 3125 SCALE

FIG. 4

| MESH INFORMATION OF TYPE A (8 BYTE) | MESH INFORMATION OF TYPE B (8 BYTE) | ... | MESH INFORMATION OF TYPE N (8 BYTE) |
|---|---|---|---|
| MESH (1: 6250 SCALE) | | | |

CIRCUMFERENCE SEARCH METHOD FOR SETTING PATH AND NAVIGATION SYSTEM

This application is a National Stage of International Application No. PCT/KR2007/006616 filed Dec. 18, 2007 and claims priority Korean Patent Application No. 10-2007-0047720 filed on May 16, 2007, in the Korean Intellectual Property Office, the disclosure of which is incorporated herein in its entirety by reference.

BACKGROUND

The present invention relates to a navigation system, and more particularly, to a navigation system and vicinity search method for route setting to retrieve a facility around a route and set the route or intermediate point through a vicinity search.

BACKGROUND ART

A navigation system is a system which provides information for driving of a transportation device, such as a vehicle, using an artificial satellite. The navigation system is automatic.

The navigation system receives predetermined data from a Global Positioning System (GPS) satellite above the Earth using a GPS receiver, and calculates its own location based on the received data. Also, the navigation system includes a recording medium such as a memory to store map data, and provides a variety of services to a user using the map data stored in the recording medium. For example, the navigation system may provide a user with information about a current location of a vehicle based on calculated location information, perform routing to calculate a route to a desired destination, and provide guidance about the route.

The navigation system divides a national map into a grid of regular size and stores map data for each grid. A unit of the grid is referred to as 'mesh'. Also, the navigation system provides each grid with an index, and thereby may enable map data to be retrieved for each index.

The navigation system stores map data and Point Of Interest (POI) information, and uses the map data and POI information as information for route guidance. The POI information includes information about areas, buildings, and roads on a map.

When a destination is set for route setting, the navigation system uses a route search menu. A method for route search includes an address search, name search, vicinity search, road name search, and the like.

The address search retrieves a location using an address corresponding to a destination. The name search retrieves a location using a name corresponding to a destination. The vicinity search retrieves a location using facilities, that is, POI. The road name search retrieves a location using a road name.

In particular, the vicinity search is for retrieving facilities located within a predetermined radius based on a current location. In the vicinity search, facilities may be categorized by a hospital, drug store, gas station, parking lot, bank, lodging, restaurant, convenience store, subway, and the like. When a user selects a category corresponding to a desired facility from the categories, a facility of the category may be retrieved.

For the vicinity search, index information of a grid corresponding to a current location is ascertained, raw database storing facility information is retrieved, and a facility of a category, desired to be retrieved by a user, is retrieved.

However, a vicinity search in a conventional art is a search method based on a grid (mesh). Accordingly, a vicinity search in a conventional art ascertains only grid information on an index, and whether a facility desired to be retrieved by a user exists may be determined through a search using an overlap operation to the raw database. Thus, a system performance may be degraded, for example, a decrease in search speed, increase in the number of disk inputs/outputs, and the like.

Also, in a vicinity search in a conventional art, facilities are retrieved based on a current location. However, since all facilities on an entire route from a start point to a destination may not be searched, a facility search is performed in an area where a search is required while driving. Particularly, a vicinity search radius is fixed based on a current location, and thus a change or correction may not be performed.

Also, in a conventional art, facilities of a category selected by a user are simply listed on a search menu as a search result of vicinity search. Accordingly, it is not easy to recognize a location of a facility corresponding to a search result.

SUMMARY

Technical Goals

The present invention provides a vicinity search method and navigation system which enable facilities to be retrieved for each category with respect to an entire route as opposed to a current location.

The present invention also provides a vicinity search method and navigation system where a search radius of a route may be modified or changed.

The present invention also provides a vicinity search method and navigation system which enable facilities with respect to at least one category to be retrieved.

The present invention also provides a vicinity search method and navigation system which enable a location of a facility to be easily ascertained through a vicinity search based on a route.

The present invention also provides a vicinity search method and navigation system which increase a facility search speed, and thereby may improve a performance of the navigation system.

Technical Solutions

According to an aspect of the present invention, there is provided a vicinity search method for route setting, the vicinity search method including: retrieving a route between a start point and a destination; retrieving a facility with respect to at least one category based on the retrieved route according to a command of a user; and displaying the retrieved facility for each category on the retrieved route.

According to another aspect of the present invention, there is provided a navigation system, including: a user interface to input, by a user, a facility retrieval command with respect to at least one item; a storage unit changing a grid unit of a national map to a bit of $2^n$ byte and storing grid information of a facility for each category as information in bits; and a control unit retrieving a facility based on a route between a start point and a destination using the information in bits stored in the storage unit and displaying the retrieved facility on the retrieved route for each category.

According to the present invention, facilities around a route with respect to at least one category may be retrieved, a facility search may be performed through only indexing, and thus search speed may be improved.

BRIEF DESCRIPTION OF DRAWINGS

FIG. 3 is a diagram illustrating a grid unit being represented as one bit of 8 bytes according to an embodiment of the present invention;

FIG. 4 is a diagram illustrating a configuration of an index storing grid information of a facility for each category as information in bits according to an embodiment of the present invention;

DETAILED DESCRIPTION OF THE ILLUSTRATED EMBODIMENTS

Hereinafter, embodiments of the present invention are described in detail by referring to the figures.

Figure 1:
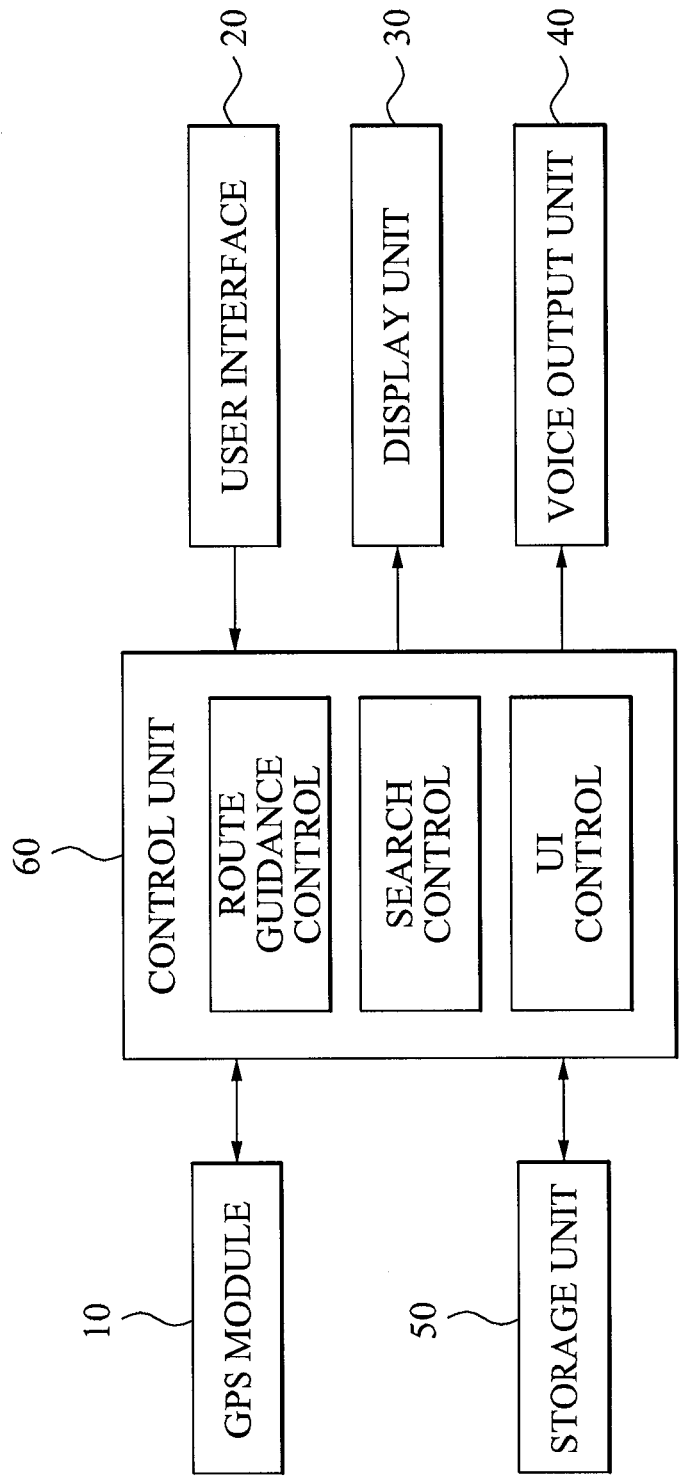
FIG. 1 is a block diagram illustrating a configuration of a navigation system according to an embodiment of the present invention.
Figure 5:
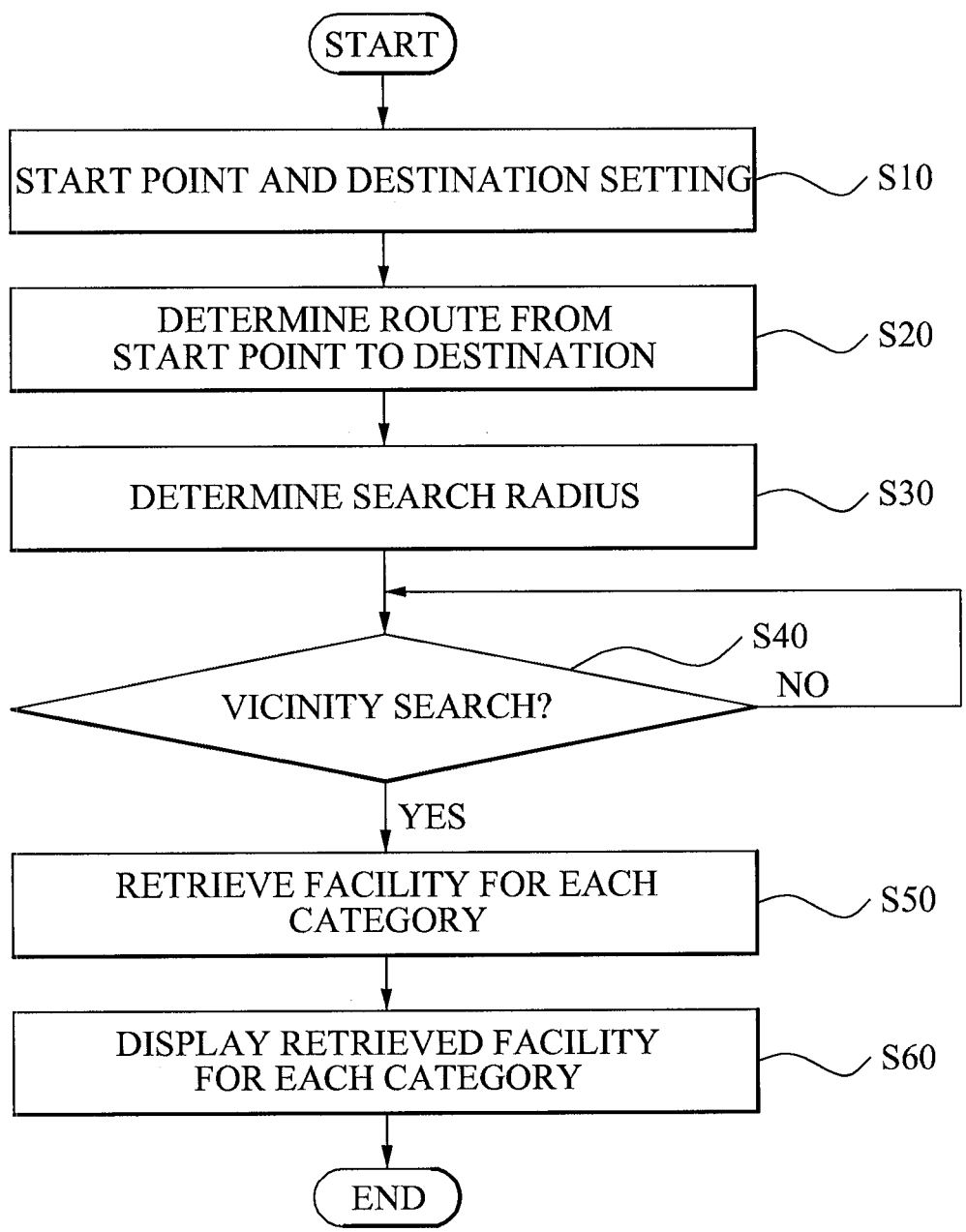
FIG. 5 is a flowchart illustrating a vicinity search method for route setting according to an embodiment of the present invention.

FIG. 1 is a block diagram illustrating a configuration of a navigation system according to an embodiment of the present invention. FIG. 5 is a flowchart illustrating a vicinity search method for route setting according to an embodiment of the present invention.

First, the navigation system is described in detail with reference to FIG. 1.

According to an embodiment of the present invention, the navigation system includes a Global Positioning System (GPS) module 10. The GPS module 10 receives a location signal from at least three GPS satellites, and calculates its own location.

The navigation system retrieves a facility for each category based on a route, and retrieves facilities around the route using only index information about map data. In this instance, at least one category exists.

The navigation system includes a user interface 20, display unit 30, voice output unit 40, storage unit 50, and control unit 60, as illustrated in FIG. 1.

The storage unit 50 includes a map database including map data of a national map and route guidance data associated with the map data. Also, the storage unit 50 stores a route guidance control program, user interface (UI) control program, and search control program. The route guidance control program is for controlling an entire operation including a route guidance function of the navigation system. The UI control program controls an execution of the user interface 20 for route search and route setting. The search control program controls a facility search with respect to at least one category based on a route.

The storage unit 50 divides the national map into a grid with a predetermined size, that is, mesh, and stores map data for each grid. Also, an index is provided for each grid, and stored in index information. Accordingly, map data for each grid may be managed and accessed through the index information.

Specifically, it is preferable that facility information is stored in the index information stored in the storage unit 50 as information in bits. The facility information is categorized by various types of facilities on a map such as a hospital, drug store, gas station, parking lot, bank, accommodation, restaurant, convenience store, subway, and the like.

Figure 2:
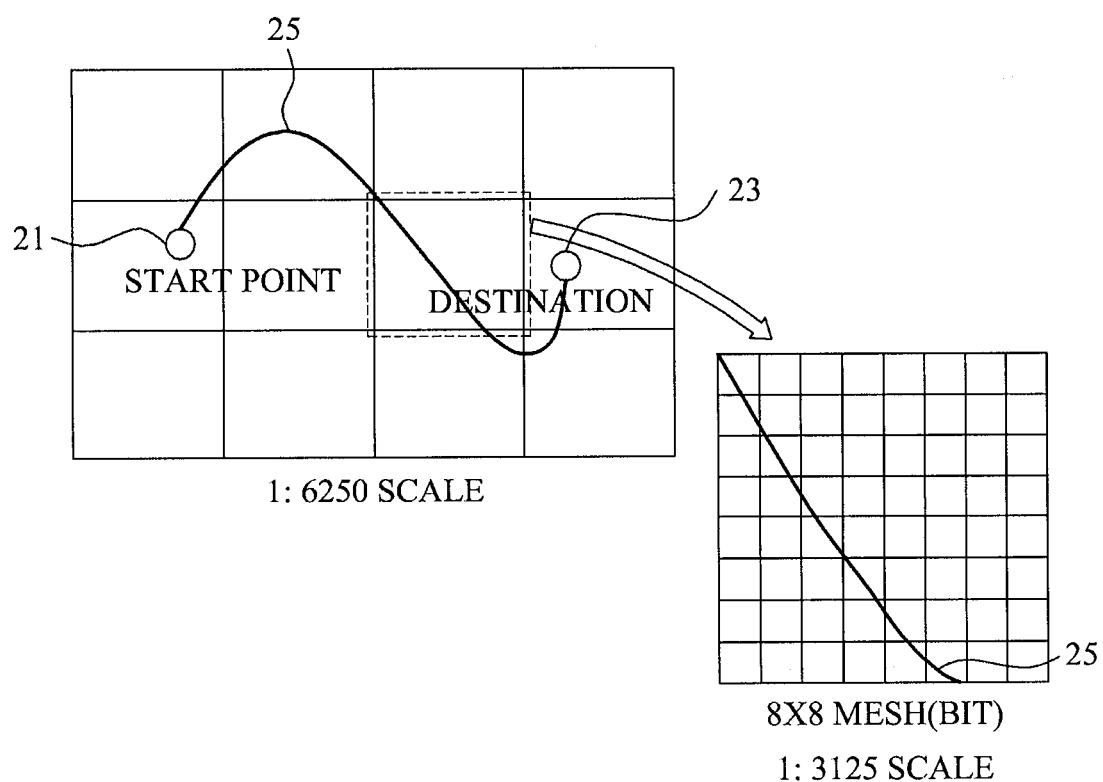
FIG. 2 is a diagram illustrating a map divided into a grid using $2^n$ bytes and a grid unit being represented as one bit according to an embodiment of the present invention.

FIG. 2 is a diagram illustrating a map divided into a grid using $2^n$ bytes and a grid unit being represented as one bit according to an embodiment of the present invention.

As illustrated in FIG. 2, each grid unit including a start point 21, destination 23, and route 25 to the destination 23 may be divided into a bit of $2^n$ byte.

For example, as illustrated in FIG. 3, when converting the grid unit into one bit of 8 bytes, a single grid unit may be represented as one bit of 64 bits.

Information in bits corresponding to a location of a facility where a user is located for each category is provided using the unit of 64 bits. Also, the information in bits for each category is stored in the index information of the storage unit 50.

FIG. 4 is a diagram illustrating a configuration of an index storing grid information of a facility for each category as information in bits according to an embodiment of the present invention.

As illustrated in FIG. 4, index information may be configured by dividing information in bits of each facility, included in a corresponding grid, by each category A, category B, . . . , category N with respect to a single grid of a specific level such as a scale of 1:6250. That is, information in bits corresponding to a location of each facility is provided as grid information of a facility where a user is located for each category. Also, the information in bits is stored in the index information.

Facilities for each category may be retrieved using only index information without accessing a raw database storing actual facility information, in the configuration of the index in FIG. 4. Also, in the configuration of the index in FIG. 4, since the information in bits is stored for each category, facilities with respect to a plurality of categories may be easily retrieved.

The display unit 30 displays map information for the route guidance and a variety of contents according to each system operation. A Liquid Crystal Display (LCD) or Electro Luminescence (EL) may be used as the display unit 30.

The user interface 20 is for inputting a user command with respect to a route guidance function, for example, inputting a destination. The user interface 20 may be a touch pad formed integrally with the display unit 30, and provides a user graphic interface unit. Every menu environment associated with the route guidance function of the navigation system may be provided as a graphic screen through the display unit 30. A user command may be inputted by touching a particular location on the graphic screen using a stylus pen, fingers, and the like.

The voice output unit 40 provides voice guidance when providing guidance about the route, and outputs a voice signal for the route guidance.

The control unit 60 ascertains a current location of the user using a GPS signal received through a GPS module 10 under the route guidance control program, retrieves a route from the current location to a destination from the map data stored in the storage unit 50, and generates a route. Also, the route guidance is provided using the display unit 30 and/or voice output unit 40 according to the generated route.

Specifically, the control unit 60 selects a category of facility desired to be retrieved under the UI control program, and provides a user menu to set an intermediate point from among the retrieved facilities. Also, the control unit 60 retrieves facilities around the route for each category based on the route under the search control program, and displays the retrieved facilities for each category on the route.

An operation of the control unit 60 is described in greater detail with reference to FIG. 5 for the vicinity search and route setting/guidance.

As illustrated in FIG. 5, when a user sets a start point and destination with respect to a route guidance function in operation S10, at least one route from the start point to the destination is retrieved and provided.

After the user selects a route desired to be provided from the retrieved at least one route in operation S20, when a route guidance command is inputted, the route is provided through a map screen and voice guidance to enable the user to drive according to the selected route, hereinafter, referred to as a 'search route'.

A vicinity search function to search surrounding facilities on the search route may be performed before or while providing guidance about the search route. Also, the surrounding facilities on the search route may be retrieved and at least one facility may be set as an intermediate point through the vicinity search In operation S30, a search radius where a facility search is to be performed is required to be determined based on the search route, for the vicinity search with respect to the search route.

A vicinity search function according to an embodiment of the present invention retrieves facilities located within a predetermined search radius based on the entire search route as opposed to a current location of the user.

Figure 6:
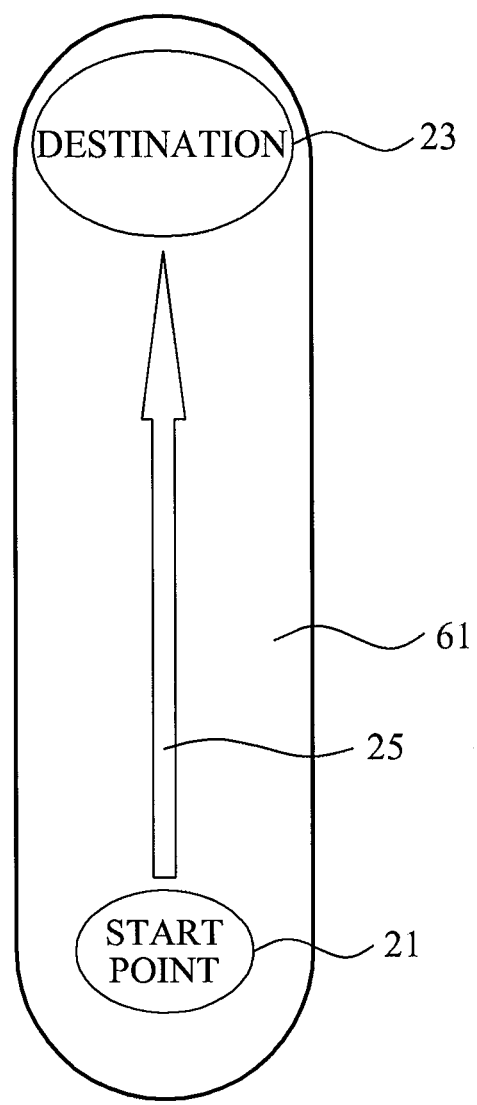
FIGS. 6 through 9 are diagrams illustrating examples of search radius settings to retrieve a facility based on a route according to an embodiment of the present invention.

As illustrated in FIG. 6, a search radius 61 may be set to be constant with respect to an entire search route. Specifically, a search radius 61 of a start point 21 and destination 23 is identical to a search radius 61 of a route 25 between the start point 21 and destination 23.

Figure 7:
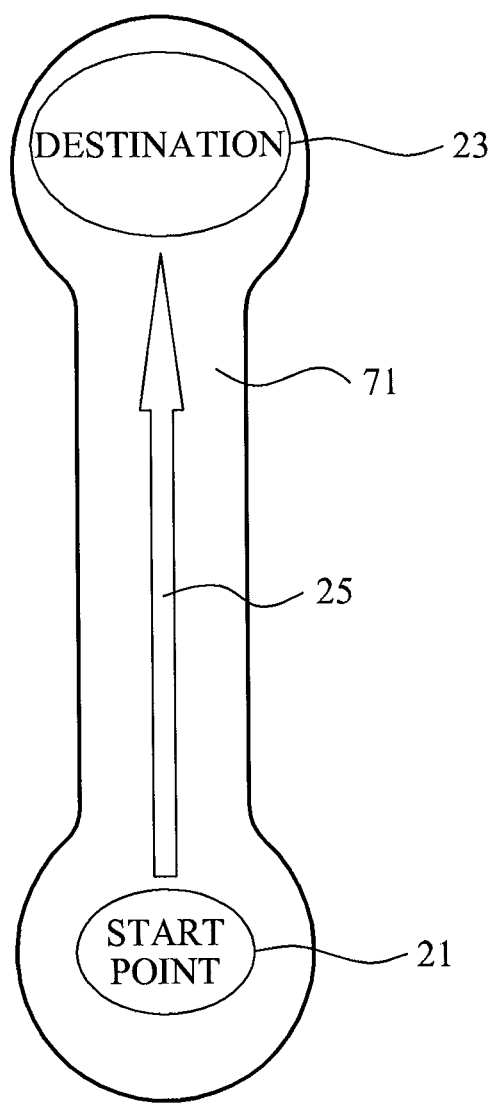
Figure 8:
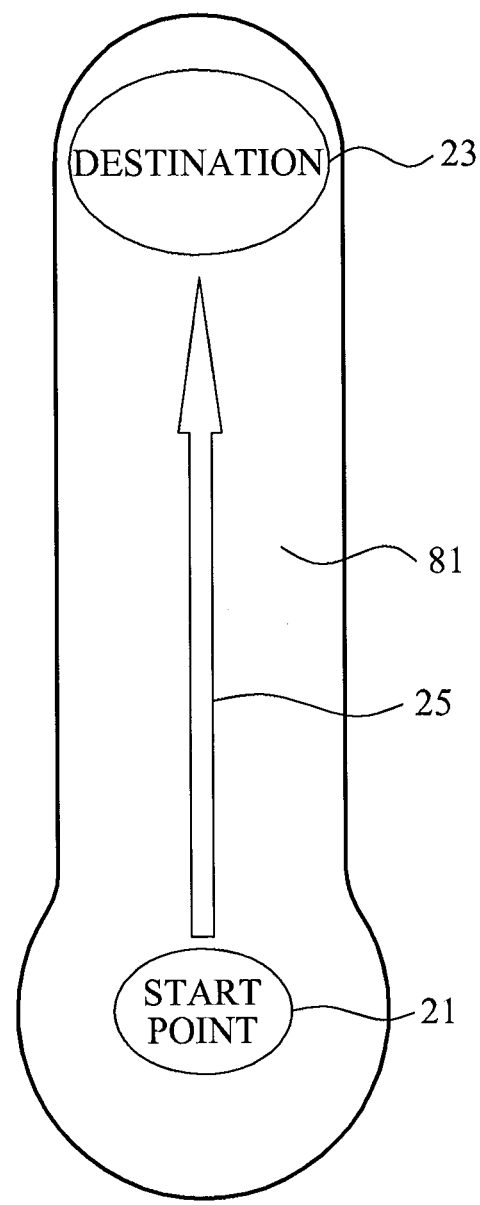
Figure 9:
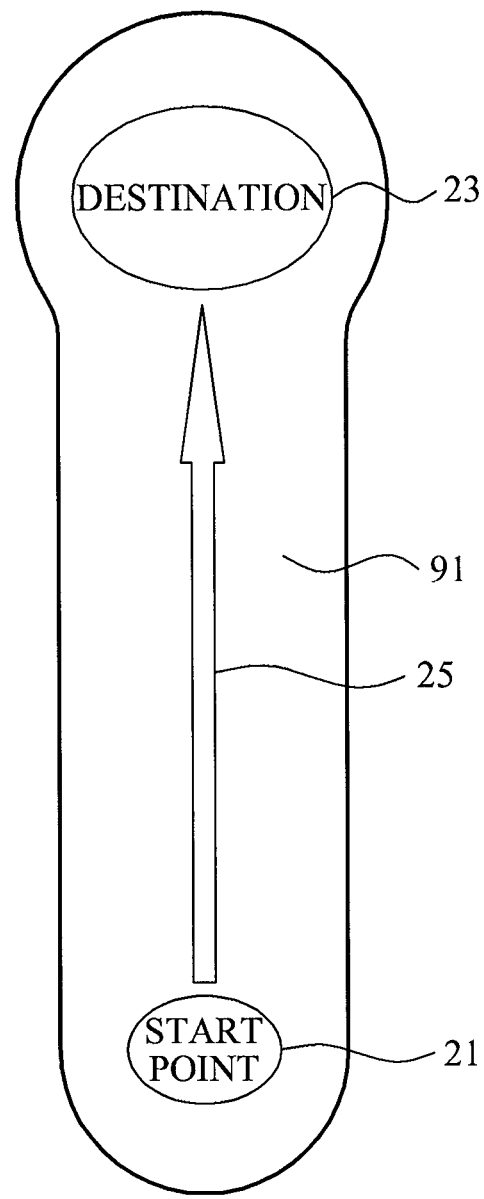

As illustrated in FIGS. 7 through 9, a search radius may be set differently depending on a location on a route.

In FIG. 7, a search radius 71 of a start point 21 and destination 23 is set to be greater than a search radius 71 of a route 25. In FIG. 8, a search radius 81 of a start point 21 is set to be greater than a search radius 81 of a destination 23 and route 25, or the search radius 81 may be set to be gradually reduced from the start point 21 to the destination 23. In FIG. 9, a search radius 91 of a destination 23 is set to be greater than a search radius 81 of a start point 21 and route 25, or the search radius 81 may be set to be gradually reduced from the destination 23 to the start point 21.

A search radius of a current location on the search route may be set to be greater than a search radius of another route.

Also, the search radius of the vicinity search with respect to the search route may be set based on a link property of the search route. The link property is any one of an express way and general road. When the search route is the general road, a search radius in the general road may be set to be greater than a search radius in the express way. Also, a link property different from the search route may be excluded when setting the search radius. For example, when the search route is the express way, the general road may be excluded from a search radius when setting the search radius.

The search radius with respect to the vicinity search may be set in various methods in addition to the above-described methods. The search radius with respect to the vicinity search may be set by providing a user menu to enable a user to select the user menu on his/her own, or the search radius may be set to use any one of the above-described methods during a manufacturing process.

When the user inputs a vicinity search command with respect to the search route in operation S40, a category selection screen is provided to enable the user to select a category of a facility desired to be retrieved by the user.

Figure 10:
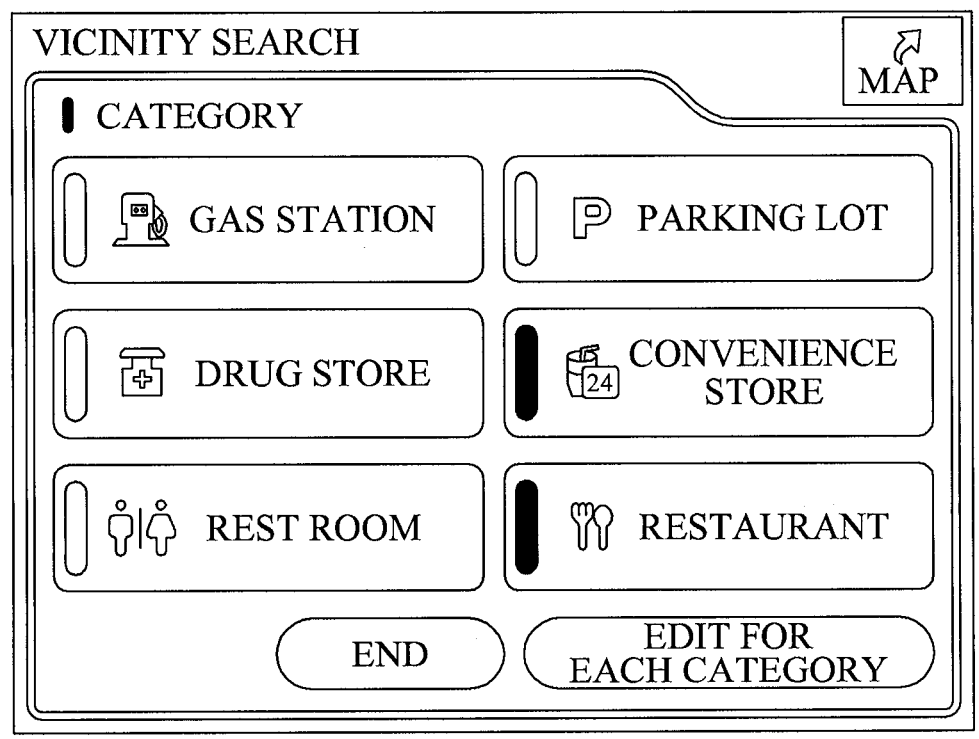
FIG. 10 is a diagram illustrating a category selection screen to select a category of a facility with respect to a vicinity search according to an embodiment of the present invention.

FIG. 10 is a diagram illustrating a category selection screen to select a category of a facility with respect to a vicinity search according to an embodiment of the present invention.

As illustrated, facilities existing on a map are sorted by each category, and a category list with respect to the facilities is provided on the screen. A category of a facility, desired to be retrieved by the user, is selected from the category list on the screen, and a search command with respect to the selected category is inputted.

In operation S50, a facility corresponding to the selected category is retrieved based on a predetermined search radius on the search route according to the vicinity search command.

The facility within the search radius on the search route is retrieved using information in bits of facility for each category, that is, index information. The index information is stored in a storage unit 50.

In operation S60, a location of the retrieved facility is ascertained from the information in bits of facility for each category, and displayed on the map screen displaying the search route.

Figure 11:
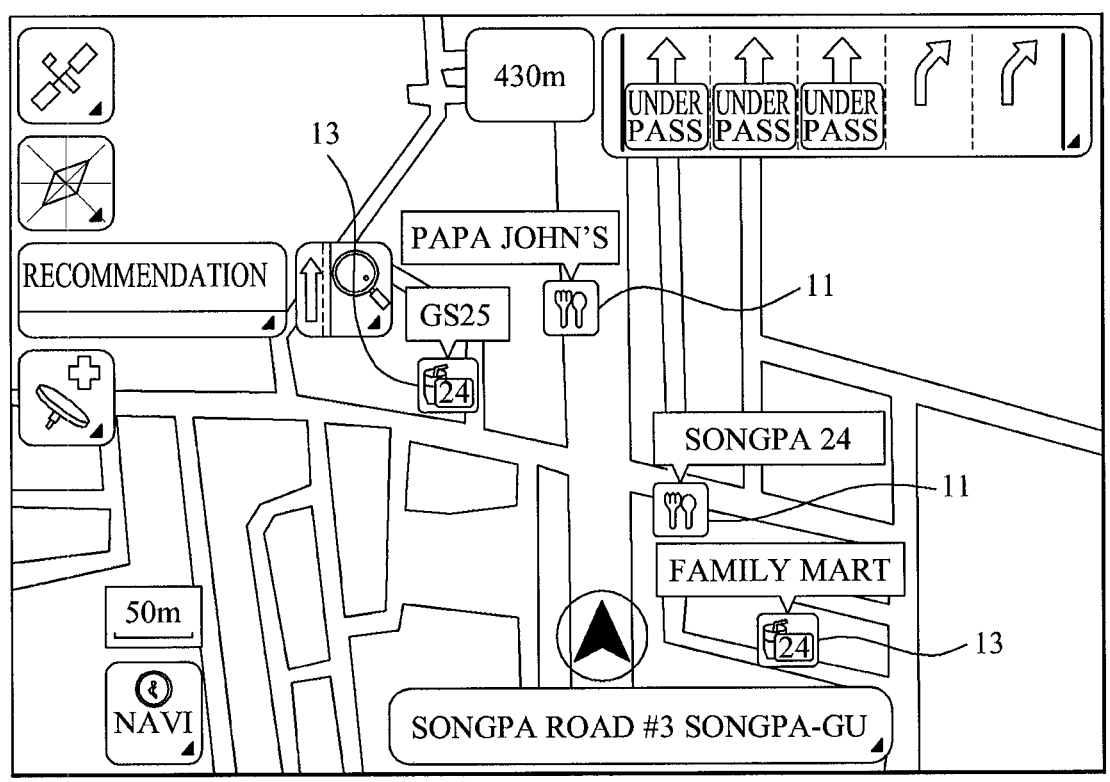
FIG. 11 is a diagram illustrating an example of displaying a location of a facility for each category on a map screen of a route based on a vicinity search according to an embodiment of the present invention.

FIG. 11 is a diagram illustrating an example of displaying a location of a facility for each category on a map screen of a search route based on a vicinity search according to an embodiment of the present invention.

As illustrated, retrieved facilities are displayed on a corresponding location to enable a user to verify the location of the facility on the search route.

Also, a category selection screen is executed again, and thus the user may select another desired category for the vicinity search. That is, facilities may be sequentially retrieved with respect to at least one category.

Facilities of a plurality of categories are displayed on the map screen of the search route. In this instance, it is preferable that the retrieved facilities are represented as icons different from each other for each category to be easily differentiated. For example, as illustrated in FIG. 11, an icon 11 for a category of restaurant and icon 13 for a category of convenience store may be differently represented.

That is, the icon for each category is displayed on a corresponding location of each facility on the map screen of the search route, and thus the location of each facility may be displayed based on the search route.

The retrieved facilities are displayed on the corresponding location on the route using the icon for each category. When the user is approaching a location of the displayed facility while driving, voice guidance about the facility, for example, "There is a Papa John's around the search route.", may be provided.

Also, when the user inputs an intermediate setting command with respect to at least one facility of the facilities displayed on the map screen on the search route through the vicinity search, a corresponding facility is designated as an intermediate point, and guidance about a route via the designated intermediate point may be provided.

For this, it is preferable that an intermediate setting icon is activated on the map screen all the time. When the intermediate setting icon is inputted after selecting the at least one facility of the retrieved facilities through the vicinity search, a facility where the intermediate setting icon is inputted is designated as the intermediate point, and the registered intermediate point passes in a predetermined order.

In this instance, a facility registered as the intermediate point may be displayed differently from the other facilities retrieved through the vicinity search. Specifically, an icon for representing the intermediate point may be separately provided and the intermediate point icon may be displayed on a location of the facility registered as the intermediate point.

Also, the order of passing the intermediate point may be determined in an order selected by the user, an order of distance from a start point of the search route, or an order of distance from a current location.

According to the present invention, facilities around the search route may be retrieved with respect to at least one category, a facility search may be performed through only indexing, and thus search speed may be improved.

The above-described embodiment of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to an embodiment of the present invention, a vicinity search method and navigation system which may change a search radius for a facility search when searching a facility around a search route, and thereby may easily extend or reduce a search area within the search route.

Also, according to an embodiment of the present invention, a vicinity search method and navigation system display a location of a facility on a map screen based on a search route as opposed to providing a facility list as a result of vicinity search, and thereby may enable a user to see the location of the facility based on the search route. Also, when retrieving facilities with respect to at least one category, the facilities may be differently displayed for each category, and thus the user may easily recognize the facilities.

Also, according to an embodiment of the present invention, a vicinity search method and navigation system which determine whether facilities exist on a search route using only index information without accessing a storage unit storing facility information, and thereby may reduce a number of disk inputs/outputs of a recording media and improve search speed.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A vicinity search method for route setting, the vicinity search method comprising:
   retrieving a route between a start point and a destination;
   determining a search radius with respect to the retrieved route;
   retrieving a facility for each category in the determined search radius based on the retrieved route; and
   displaying the retrieved facility for each category on the retrieved route,
   wherein the determining sets a search radius of the start point, a search radius of the destination and a search radius of the route between the start point and the destination.

2. The vicinity search method of claim 1, wherein the determining sets the search radius of the start point and destination to be greater than the search radius of the route between the start point and the destination.

3. The vicinity search method of claim 1, wherein the determining sets the search radius of the start point to be greater than the search radius of the destination and the search radius of the route between the start point and the destination.

4. The vicinity search method of claim 1, wherein the determining sets the search radius of the destination to be greater than the search radius of the start point and the search radius of the route between the start point and the destination.

5. The vicinity search method of claim 1, wherein the determining sets the search radius of a current location on the retrieved route to be greater than the search radius of a route excluding the current location.

6. The vicinity search method of claim 1, wherein the determining determines a link property of the retrieved route and determines the search radius based on the link property.

7. The vicinity search method of claim 6, wherein the link property is any one of an express way and general road, and when the retrieved route is the general road, the search radius is set to be greater than the express way.

8. The vicinity search method of claim 6, wherein the link property is any one of an express way and general road, and a link property different from the retrieved route is excluded and the search radius is determined.

9. The vicinity search method of claim 1, wherein the retrieving of the facility comprises:
   previously storing grid information of a facility where the user is located for each category as information in bits in a grid index with respect to a national map, the grid information indicating a location of the facility; and
   ascertaining grid information corresponding to the search radius including the retrieved route and retrieving the facility for each category using information in bits corresponding to the grid information.

10. The vicinity search method of claim 9, wherein the previously storing converts a grid unit into a bit of $2^n$ byte and provides information about a facility located in a corresponding grid as the information in bits for each category.

11. The vicinity search method of claim 1, wherein the retrieving of the facility retrieves a facility within the search radius in an order selected by a user on at least one category.

12. The vicinity search method of claim 1, wherein the displaying comprises representing the retrieved facility as an icon for each category and displaying a location of the facility on a map screen of the retrieved route using the icon.

13. The vicinity search method of claim 12, wherein the displaying further comprises:
   outputting voice guidance about the facility when the user is approaching the location of the displayed facility while driving.

14. The vicinity search method of claim 12, wherein the displaying further comprises:
   selecting at least one facility from facilities displayed on the map screen of the retrieved route; and
   setting the selected facility as an intermediate point.

15. The vicinity search method of claim 14, wherein the displaying further comprises:

displaying the facility, set as the intermediate point, differently from other facilities on the retrieved route.

16. The vicinity search method of claim 14, wherein an order of passing the intermediate point is determined in an order selected by the user, an order of distance from the start point, or an order of distance from a current location.

17. A non-transitory computer-readable recording medium storing a program for implementing a vicinity search method for route setting, comprises:

retrieving a route between a start point and a destination;

determining a search radius with respect to the retrieved route;

retrieving a facility for each category in the determined search radius based on the retrieved route; and displaying the retrieved facility for each category on the retrieved route, wherein the determining sets a search radius of the start point, a search radius of the destination and a search radius of the route between the start point and the destination.

18. A navigation system, comprising:

a user interface to input, by a user, a facility retrieval command with respect to at least one item;

a storage unit changing a grid unit of a national map to a bit of $2^n$ byte and storing grid information of a facility for each category as information in bits; and a control unit determining a search radius with respect to a route between a start point and a destination using the information in bits stored in the storage unit, retrieving a facility for each category in the determined search radius based on the retrieved route, and displaying the retrieved facility on the retrieved route for each category, wherein the control unit sets a search radius of the start point, a search radius of the destination and a search radius of the route between the start point and destination.

* * * * *